J. F. JUDY.
LIQUID-MEASURE.
No. 183,306. Patented Oct. 17, 1876.
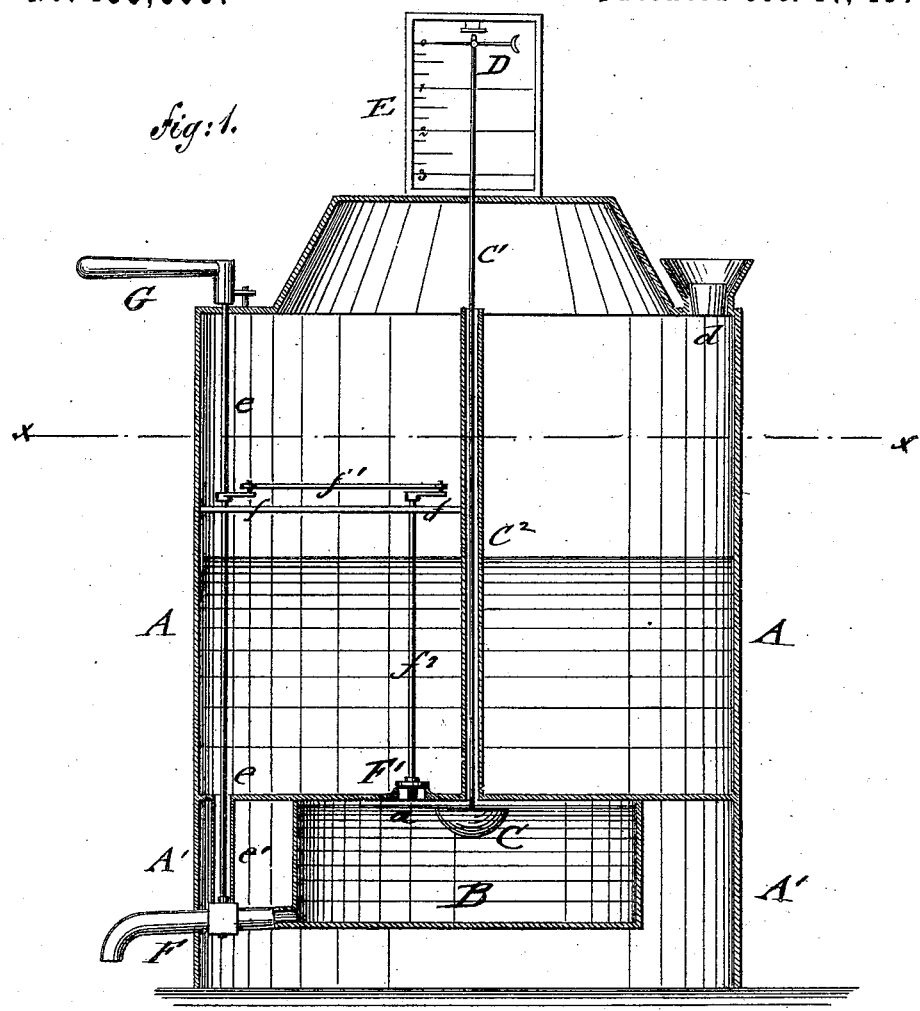
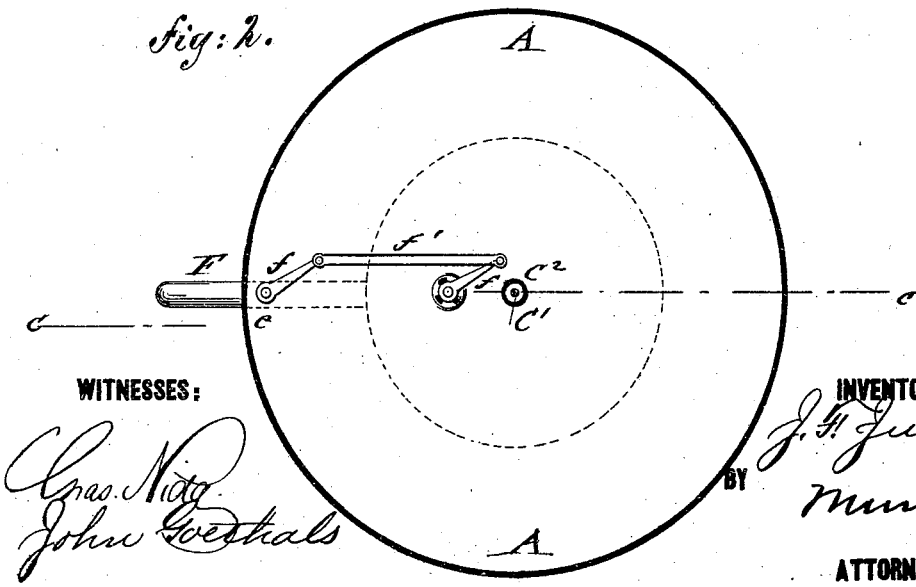

UNITED STATES PATENT OFFICE.

JOHN F. JUDY, OF FERDINAND, INDIANA.

IMPROVEMENT IN LIQUID-MEASURES.

Specification forming part of Letters Patent No. 183,306, dated October 17, 1876; application filed March 25, 1876.

*To all whom it may concern:*

Be it known that I, JOHN F. JUDY, of Ferdinand, in the county of Dubois and State of Indiana, has invented a new and Improved Measuring Can and Tank, of which the following is a specification:

In the accompanying drawing, Figure 1 represents a vertical central section of my improved measuring can and tank, taken on the line $c\ c$, Fig. 2; and Fig. 2 is a horizontal section of the same on line $x\ x$, Fig. 1.

Similar letters of reference indicate corresponding parts.

My invention relates to an improved measuring can and tank for coal-oil and other liquids, that admits the measuring of any quantity, in perfectly clean and rapid manner, without spilling or smell, the can forming a neat vessel for stores, without the unsightly measures.

The invention will first be described in connection with drawing, and then pointed out in the claim.

In the drawing, A represents a reservoir or tank, of any suitable size, for holding any quantity of coal-oil or other liquid. A measuring-can, B, is arranged at the bottom of the tank A, and connected therewith by a supply-hole, $a$. The measuring-can B is made to contain a suitable fixed quantity of liquid, and is protected against injury by means of a surrounding flange, A', on which the entire apparatus is supported.

A float, C, rises or lowers with the level of the fluid in the measuring-can B, and indicates the quantity drawn off by an index-hand or pointer, D, secured at the top end of the wire-rod $c^1$ that passes from the float through a protecting-tube, $c^2$, of the tank, to an inclosed graduation or scale, E, at the top of the tank. The position of the index-hand D on the scale E indicates the quantity drawn off from the measuring-can B. The central tube $c^1$ that surrounds the wire rod extends to a point above the level of the liquid, to admit the free working of the float without coming in contact with the liquid.

The tank A is filled by top opening $d$, with funnel-shaped mouth, and closed by a perforated screw-cap that admits the necessary air for drawing off the liquid.

The drawing off of the liquid from the measuring-can B, and the refilling of the same, is accomplished by two faucets, F F', operated by a crank, G, at the top part of reservoir A. The crank G is connected by a wire rod, $e$, inclosed at its lower part by a tube, $e$, with the exit-faucet F, and by means of short cranks F, and a connecting-link rod, $f^1$, with a rod, $f^2$, that operated the second faucet or valve F' of the supply-opening $a$. When the crank is turned to open the exit-faucet F the supply-faucet F' is simultaneously closed, so that the measuring-can will furnish the required quantity of liquid, as indicated by the pointer at the upper end of the float. As soon as the index or pointer reaches the desired point on the scale that indicates the quantity to be drawn off, the crank is turned back so as to close the exit-faucet and open the supply-faucet. The measuring-can is then refilled through the supply-hole from the tank, and quickly, ready for drawing off the next quantity, the index-hand furnishing always an exact indication of the quantity of liquid in the measuring-can. The drawing off of fixed quantities of coal-oil or other liquids is thus facilitated in a very convenient manner, and a supply-tank and measuring-can of reliable action provided that it may be made to form a neat and useful apparatus for stores.

Having thus described my invention, I claim as new and desire to secure by Letters Patent—

A combined measuring tank and can, in which the tank B is placed under and within the can A, so as to form a part thereof, and having the float C C', which rises up through the can, an index, D, and valves to let the liquid into, and draw it off from, the tank, all arranged to operate substantially as shown and described.

JOHN FRANK JUDY.

Witnesses:
JOHN JUDY,
CHAS. KNAPP, M. D.